United States Patent
Kurata

(10) Patent No.: US 6,552,765 B2
(45) Date of Patent: *Apr. 22, 2003

(54) COLOR FILTER FOR REFLECTION LIQUID CRYSTAL DISPLAY AND REFLECTION LIQUID CRYSTAL DISPLAY COMPRISING THE SAME

(75) Inventor: Hideaki Kurata, Sodegaura (JP)

(73) Assignee: Idemitsu Kosan Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,644

(22) PCT Filed: Mar. 19, 1999

(86) PCT No.: PCT/JP99/01390

§ 371 (c)(1),
(2), (4) Date: Nov. 18, 1999

(87) PCT Pub. No.: WO99/49356

PCT Pub. Date: Sep. 30, 1999

(65) Prior Publication Data

US 2002/0051104 A1 May 2, 2002

(30) Foreign Application Priority Data

Mar. 24, 1998 (JP) ............................................ 10-075745

(51) Int. Cl.[7] ............................................ G02F 1/1335
(52) U.S. Cl. ........................ 349/113; 349/106; 349/110
(58) Field of Search ................................ 349/106, 110, 349/113

(56) References Cited

U.S. PATENT DOCUMENTS 4,772,885 A * 9/1988 Uehara et al. ............... 340/784
5,420,708 A * 5/1995 Yokoyama et al. ............ 359/67
5,514,229 A * 5/1996 Parkansky et al. .......... 148/566

(List continued on next page.)

FOREIGN PATENT DOCUMENTS

| DE | 99 711 | 8/1973 |
| EP | 0 132 068 | 1/1985 |
| EP | 08766585 | 10/1996 |

(List continued on next page.)

OTHER PUBLICATIONS

Kuo et al., "8.1 A 10.4-in. Reflective MTN Mode TFT–LCD with Video–Rate and Full–Color Capabilities", 1997 Sid International Symposium Digest of Technical Papers, Boston, vol. 28, May 13–15, 1997, pp. 79–82.

Phillips et al., "Zinc–indium–oxide: A high conductivity transparent conducting oxide", Applied Physics Letters, American Institute of Physics, New York, US, vol. 67, No. 15, Oct. 9, 1995, pp. 2246–2248.

Fehlner, "Thin films on glass for liquid crystal displays", Jounal of Non–Crystalline Solids, vol. 218, Sep. 1, 1997, pp. 360–367.

*Primary Examiner*—William L. Sikes
*Assistant Examiner*—Tarifur R. Chowdhury
(74) *Attorney, Agent, or Firm*—Oblon, Spivak, McClelland, Maier & Neustadt, P.C.

(57) ABSTRACT

Provided is a color filter 29 for reflection-type liquid crystal display devices, which comprises a light-reflecting layer 22, a transparent electrode 23, and a colorant layer 24 with electroconductive grains therein, as laminated in that order on a transparent or opaque substrate 21. Also provided is a reflection-type liquid crystal display device comprising the color filter, in which a substrate 27 having a transparent electrode 26 formed thereon is so combined with the color filter that the transparent electrode 26 faces the light input side of the color filter via a liquid crystal layer 25 existing therebetween. With that constitution, the device enjoys a broad angle of visibility and is not troubled by color drift (color mixing) The device can produce light images in light conditions.

27 Claims, 2 Drawing Sheets

U.S. PATENT DOCUMENTS

| | | | | |
|---|---|---|---|---|
| 5,705,302 A | * | 1/1998 | Ohno et al. | 430/7 |
| 5,729,313 A | * | 3/1998 | Mitsui | 349/106 |
| 5,972,527 A | * | 10/1999 | Kaijou et al. | 428/697 |
| 6,008,872 A | * | 12/1999 | Den Boer et al. | 349/106 |
| 6,025,899 A | * | 2/2000 | Fukunaga et al. | 349/115 |
| 6,040,056 A | * | 3/2000 | Anzaki et al. | 428/432 |
| 6,104,459 A | * | 8/2000 | Oike et al. | 349/105 |
| 6,122,027 A | * | 9/2000 | Ogawa et al. | 349/113 |

FOREIGN PATENT DOCUMENTS

| | | | | |
|---|---|---|---|---|
| JP | 62-266520 A | * | 11/1987 |
| JP | 01-204307 A | * | 8/1989 |
| JP | 03-256025 A | * | 11/1991 |
| JP | 06-18861 A | * | 1/1994 |
| JP | 06-234521 A | * | 8/1994 |
| JP | 08-166585 A | * | 6/1996 |
| JP | 09-179109 A | * | 7/1997 |
| JP | 10-301129 A | * | 11/1998 |

* cited by examiner

COLOR FILTER FOR REFLECTION LIQUID CRYSTAL DISPLAY AND REFLECTION LIQUID CRYSTAL DISPLAY COMPRISING THE SAME

TECHNICAL FIELD

The present invention relates to a color filter for reflection-type liquid crystal display devices, which is used in color liquid crystal display devices, color input devices, etc., and to a reflection-type liquid crystal display device comprising the color filter.

BACKGROUND ART

Color liquid crystal display devices include transmission-type color liquid crystal display devices and reflection-type color liquid crystal display devices, all of which are driven in an electric field, with saving power, and give high-quality images such as those typically in TFT liquid crystal display devices. Therefore, they are being much highlighted as display devices favorable to the recent multimedia technology.

For obtaining satisfactory light images, in general, much used are light-incorporating, transmission-type liquid crystal display devices of a backlight or sidelight type in which is disposed a light source (of a lamp such as a fluorescent micro-lamp or the like), for example, on the back or side of the liquid crystal panel. However, the transmission-type liquid crystal display devices of that kind require much power for the lamp therein, and lose the advantages of power-saving, lightweight and portable characteristics intrinsic to liquid crystal display devices.

On the other hand, for lighting the liquid crystal display panel in reflection-type liquid crystal display devices, used is reflecting room light or external light as the light source. Therefore, the devices do not require a lamp to be built therein, and their display panel could be thinned. In addition, the battery life for them could be prolonged. For these reasons, they are ideal power-saving display devices. Further, as being lightweight, they are handy for mobile display devices.

FIG. 4 shows a cross section of a conventional, reflection-type liquid crystal display device. As illustrated, the device comprises a (first) substrate 41 on the light reflection side and a (second) substrate 42 on the light input side, which are so disposed as to face each other via a liquid crystal layer 48 being sandwiched therebetween; a reflection electrode 43 formed on the first substrate 41 to face the liquid crystal layer; a color filter which is composed of a colorant layer 44 of red (R), green (G) and blue (B) formed on the second substrate 42 to face the liquid crystal layer, a light-shielding layer 45 formed between the adjacent colorants, a planar layer 46 formed on the colorant layer 44 and the light-shielding layer 45, and a transparent electrode 47 formed on the planar layer 46; and a polarizing plate 49 disposed on the outer surface of the second substrate 42.

In the liquid crystal display device illustrated, however, the color filter is disposed on the light input side, and the colorant layer of the color filter is spaced from the reflection electrode via a gap therebetween. Therefore, in the device, the light having reflected on the reflection electrode shall pass through a site of the colorant layer which differs from that through which the incident light has passed, owing to the gap between the colorant layer and the reflection electrode, there by causing color drift (colormixing) in the images formed. In addition, in the device, the width of the light-shielding layer to be between the adjacent colorants must be large in order to evade light leakage, with the result that the aperture is reduced and images with satisfactory brightness could not be obtained. Moreover, in fabricating the device, it is necessary to align the position of the color layer on the light input side with that of the reflection electrode on the light reflection side, and the yield in the device fabrication is poor.

Another reflection-type liquid crystal display device (FIG. 5) has been proposed. The device comprises a first substrate 51 on the light reflection side; a reflection electrode 53 formed on the first substrate 51 to face a liquid crystal layer; a color filter composed of a colorant layer 54 and a transparent electrode 56 and formed on the reflection electrode in that order; a second substrate 52 on the light input side; another transparent electrode 56 formed on the second substrate 52 to face the liquid crystal layer; and a polarizing plate formed on the outer surface of the second substrate 52. In the device, however, contact through-holes 59 must be formed through the colorant layer, via which the reflection electrode of being a pixel electrode is electrically connected with the transparent electrode (liquid crystal driving electrode) 56 formed on the surface of the colorant layer. Forming the contact through-holes requires a complicated process, with the result that the yield in the device fabrication is poor. In addition, in the device, ITO (indium oxide doped with tin oxide; indium tin oxide) is generally used for forming the transparent electrode to be on the surface of the colorant layer. Therefore, where the reflection electrode is of an aluminium-based metallic substance, impurities, if any, around the electrodes will induce local cell reaction between aluminium and ITO through the contact through-holes, thereby causing interconnection breakdown. As the case may be, aluminium constituting the reflection electrode will then be blackened. In that condition, the device could not enjoy satisfactory light reflection. For these reasons, the device is still defective.

The present invention has been made in consideration of the problems noted above, and its object is to provide an improved color filter for reflection-type liquid crystal display devices, and to provide a reflection-type liquid crystal display device comprising it. With the color filter, the reflection-type liquid crystal display device of the invention is not troubled by color drift (color mixing), and enjoys a broad angle of visibility. In addition, even when driven for a long period of time, the device is not troubled by interconnection breakdown and reflectance depression, and all the time can produce light images.

DISCLOSURE OF THE INVENTION

In order to attain the object as above, the invention provides a color filter for reflection-type liquid crystal display devices, which comprises a light-reflecting layer, a transparent electrode, and a colorant layer containing fine electroconductive grains therein, as laminated in that order on a transparent or opaque substrate.

In one preferred embodiment of the color filter, the light-reflecting layer is of a metallic substance comprising aluminium as the essential component.

In another preferred embodiment of the color filter, the transparent electrode is of an amorphous electroconductive metal oxide compound comprising indium oxide and zinc oxide as the essential components.

The invention further provides a reflection-type liquid crystal display device, which comprises a first substrate and a second substrate as so disposed that they face each other via a liquid crystal layer existing therebetween, a color filter comprising a light-reflecting layer, a transparent electrode and a colorant layer with fine electroconductive grains therein as laminated in that order on the first substrate to face the liquid crystal layer, a transparent electrode formed on the second substrate to face the liquid crystal layer, and a polarizing plate formed on the outer surface of the second substrate.

In those drawings;
11, 21, 41 and 51 each indicate a substrate (of glass) on the light reflection side,
27, 42 and 52 each indicate a substrate (of glass) on the light input side,
12, 22, 43 and 53 each indicate a reflection electrode,
14, 24, 44 and 54 each indicate a colorant layer,
45 indicates a light-shielding layer,
46 indicates a planar layer,
13, 23, 26, 47 and 56 each indicate a transparent electrode,
25, 48 and 57 each indicate a liquid crystal layer,
28, 49 and 58 each indicate a polarizing plate,
59 indicates a contact through-hole,
15 and 29 each indicate a color filter,
A indicates an electrode A,
B indicates an electrode B,
C indicates an electrode C.

BEST MODE FOR CARRYING OUT THE INVENTION

The color filter for reflection-type liquid crystal display devices of the invention, and also the reflection-type liquid crystal display device of the invention are described concretely with reference to the drawings.

Figure 1:
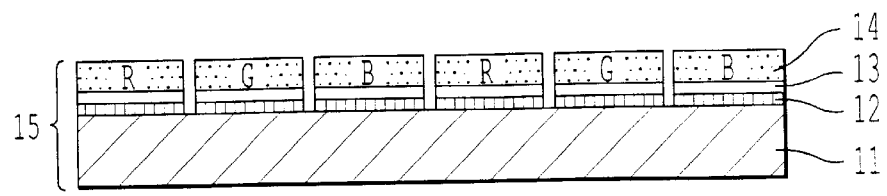
FIG. 1 is a cross-sectional view showing one embodiment of the color filter for reflection-type liquid crystal display devices of the invention.

As in FIG. 1, a color filter 15 for reflection-type liquid crystal display devices of the invention comprises a light-reflecting layer 12 which serves further as a pixel electrode, a transparent electrode 13, and an R-G-B colorant layer 14 with fine electroconductive grains therein, as laminated in that order on a transparent or opaque substrate 11. In this, the colorant layer for each colorant is spaced in the plane direction, and a light-shielding layer of resins, metals or metal oxides may be in the space between the adjacent colorants.

The substrate for use in the invention may be any conventional glass substrate, or may also be a synthetic resin film or sheet. As not being on the light output side, the substrate does not always need to be transparent.

The reflective layer serves further as a pixel electrode, for which, therefore, used is a metallic substance having low resistance and high reflectance. Concretely used are aluminium, aluminium alloys, silver, etc. Of those, preferred are aluminium and aluminium alloys as they are easy to etch for patterning and have high reflectance. The reflective layer may be formed from any of them through vacuum vapor deposition or sputtering. Its thickness preferably falls between 500 and 3000 angstroms.

As the transparent electrode, generally used is tin oxide-doped indium oxide, ITO. However, when the reflective layer that serves further as an electrode is of an aluminium-based metallic substance, then impurities, contaminants and the like, if any, around it will induce local cell reaction between aluminium and ITO, whereby aluminium in the layer will be blackened and light could not sufficiently reflect on the layer. As the case may be, devices comprising the filter will be troubled by interconnection breakdown. Therefore, as the transparent electrode, preferred is an amorphous metal oxide compound comprising indium oxide and zinc oxide as the essential components, as it does not cause local cell reaction with the reflective layer and can be well etched in patterning it into a desired pattern for the transparent electrode without dissolving the reflective layer.

The transparent electrode may be comprised of only indium oxide and zinc oxide, but may further contain a doping metal in an atomic ratio of not larger than 0.2 to the two components. The doping metal includes, for example, tin, aluminium, antimony, gallium, and selenium. To form the transparent electrode comprising, as the essential components, indiumoxide and zinc oxide doped with such a doping metal, a compound of the doping metal may be added to the indium compound and the zinc compound in the step of preparing the material for the transparent electrode.

Regarding the composition of the transparent electrode to be formed in that manner, it is desirable that the atomic ratio of In to Zn, In/(In+Zn), falls between 0.2 and 0.9, more preferably between 0.5 and 0.9. Preferably, the thickness of the transparent electrode falls between 200 and 6000 angstroms, more preferably between 600 and 2000 angstroms.

The transparent electrode of such an amorphous metal oxide compound that comprises indium oxide and zinc oxide as the essential components may be formed through sheeting in various sputtering methods (of DC sputtering, RF sputtering, DC magnetron sputtering, RF magnetron sputtering, ECR plasma sputtering, ion beam sputtering, etc.), for which are used predetermined sputtering targets, or in ion plating methods or the like.

For patterning them, the transparent electrode and the reflective layer noted above may be etched in any ordinary etching methods. For example, after having been coated with a resist on the surface of the transparent electrode, they are exposed to light via a mask, then developed with an organic solvent, and etched with an aqueous acid solution or a vapor such as CHF or the like, and thereafter the resist is peeled off. In that manner, they are patterned to have a predetermined pattern.

For the electroconductive colorant layer, for example, used are the following colorants by themselves or their solutions or dispersions in binder resin.

Red (R) colorants:
  Perylene pigments, lake pigments, azo pigments, quinacridone pigments, anthraquinone pigments, anthracene pigments, isoindoline pigments, isoindolinone pigments, etc. These may be used either singly or in the form of a mixture of at least two of them.

Green. (G) colorants:
  Polyhalogenophthalocyanine pigments, polyhalogeno-copper phthalocyanine pigments, triphenylmethanebased basic dyes, isoindoline pigments, isoindolinone pigments, etc. These may be used either singly or in the form of a mixture of at least two of them.

Blue (B) colorants:

Copper phthalocyanine dyes, indanthrone pigments, indaphenol pigments, cyanine pigments, dioxazine pigments, etc. These may be used either singly or in the form of a mixture of at least two of them.

As the binder resin for the colorants, preferred are transparent resins (having a visible ray transmittance of at least 50%). For example, employable are transparent resins (polymers) such as polymethyl methacrylates, polyacrylates, polycarbonates, polyvinyl alcohols, polyvinyl pyrrolidones, hydroxyethyl cellulose, carboxymethyl cellulose, etc.

For spacing the adjacent colorants in the colorant layer in the plane direction, photosensitive resins may be selected to which photolithography is applicable. For example, usable are photocurable resist materials having reactive vinyl groups, such as polyacrylic resins, polymethacrylic resins, polyvinyl cinnamate resins, cyclic rubber resins, etc. Where the colorant layer is formed in a printing method, printing ink (serving as a medium) that comprises a transparent resin may be selected. For this, for example, usable are transparent resins such as polyvinyl chloride resins, polyvinylidene chloride resins, melamine resins, phenolic resins, alkyd resins, epoxy resins, polyurethane resins, polyester resins, maleic resins, polyamide resins, as well as their monomers and oligomers, and also polycarbonates, polyvinyl alcohols, polyvinyl pyrrolidones, hydroxyethyl cellulose, carboxymethyl cellulose, etc.

The electroconductive material to be in the colorant layer is not specifically defined. For example, usable are fine grains of tin oxide, zinc oxide, indium oxide, tin oxide-doped indium oxide (ITO), a mixed oxide compound comprising indium oxide and zinc oxide as the essential components, carbon, as well as metals such as aluminium, nickel, chromium, etc. Of those,, preferred are tin oxide and ITO as their dispersions in colorants have good electroconductivity and transparency.

Preferably, the grain size of the fine electroconductive grains falls between 100 angstroms and 10 microns, more preferably between 500 angstroms and 2 microns. If their grain size is smaller than 100 angstroms, they could hardly exhibit electroconductivity; but if larger than 10 microns, they could not be uniformly dispersed in colorants.

The colorants containing the fine electroconductive grains may be sheeted on the transparent electrode in various methods for pigment dispersion, printing, electrodeposition, micellar electrolysis or the like, thereby to form the intended electroconductive colorant layer thereon.

Figure 2:
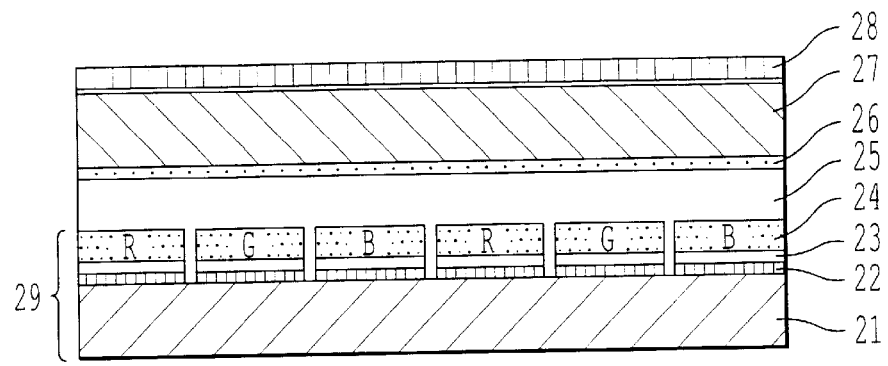
FIG. 2 is a cross-sectional view showing one embodiment of the reflection-type liquid crystal display device of the invention.

The color filter 29 for reflection-type liquid crystal display devices thus produced in the manner mentioned above is so combined with a transparent substrate 27 having thereon a predetermined pattern of an etched transparent electrode 26 that they face each other via a liquid crystal layer 25 existing therebetween, thereby to fabricate a reflection-type liquid crystal display device of the invention (see FIG. 2).

EXAMPLES

The invention is described in more detail with reference to the following Examples, which, however, are not intended to restrict the scope of the invention.

Production Example 1
Production of Electroconductive Tin Oxide

To 15 kg of pure water, added were 1500 g of electroconductive tin oxide grains of which the surface had been hydrophobicated with a silane coupling agent, and 74.25 g of a ferrocene derivative surfactant (10-ferrocenyldecanoylpolyoxyethylene), and mixed. These were dispersed for 12 hours in an ultrasonic homogenizer with the resulting dispersion being cooled to be at around 18° C. Next, this was diluted two-fold with an aqueous 0.4 wt.% solution of the same ferrocene derivative surfactant as above, and 225 g of a lithium-conditioned, chelated ion-exchange resin was added thereto, and stirred at 25° C. for 12 hours. To this was added 450 g of Sepabeads SP207 (polystyrene beads from Wako Pure Chemical Industries), and stirred at 25° C. for 12 hours.

Next, this was centrifuged in a continuous centrifuge at 1500 rpm, at a flow rate of 300 ml/min and at 25° C. to recover the dispersion from it. To the thus-recovered dispersion, added was 1.05 g, per kg of the dispersion, of lithium bromide, and stirred for 30 minutes. Thus was produced an electroconductive tin oxide dispersion.

Production Example 2
Production of Electroconductive Tin Oxide-containing, Yellow Pigment Dispersion The same process as in Production Example 1 was repeated. In this, however, the electroconductive tin oxide used in Production Example 1 was replaced with Isoindoline Yellow (from Ciba Speciality Chemicals), the amount of the ferrocene derivative surfactant (10-ferrocenyldecanoylpolyoxyethylene) was changed to 245.25 g, the ion-exchange resin was not used, and the pigment dispersion was diluted 1.72-fold with an aqueous 0.35 wt.% solution of the ferrocene derivative surfactant.

Production Example 3
Production of Electroconductive Tin Oxide-containing, Red Pigment Dispersion To 15 kg of pure water, added were 339.45 g of Dianthracequinonyl Red (from Ciba Speciality Chemicals), 56.25 g of a ferrocene derivative surfactant (10-ferrocenyldecanoylpolyoxyethylene), and 15.75 g of lithium bromide, and mixed. These were dispersed for 18 hours in an ultrasonic homogenizer with the resulting dispersion being cooled to be at around 18° C. Next, this was centrifuged in a continuous centrifuge at 10000 rpm, at a flow rate of 200 ml/min and at 25° C. to recover a red pigment dispersion from it.

The red pigment dispersion was mixed with the yellow pigment dispersion that had been prepared in Production Example 2, in a ratio by weight of 60/40 to produce a mixed, reddish yellow pigment dispersion. Next, this was further mixed with the electroconductive tin oxide dispersion that had been prepared in Production Example 1, in a ratio by weight of 50/50 to produce an electroconductive tin oxide-containing, red pigment dispersion.

Production Example 4
Production of Electroconductive Tin Oxide-containing, Green Pigment Dispersion The same process as in Production Example 1 was repeated. In this, however, the electroconductive tin oxide used in Production Example 1 was replaced with a pigment of halogeno-copper phthalocyanine (from Dai-Nippon Ink Chemical), the amount of the ferrocene derivative surfactant (10-ferrocenyldecanoylpolyoxyethylene) was changed to 299.25 g, the ion-exchange treatment was not effected, and the pigment dispersion was diluted 4.27-fold with an aqueous 0.4 wt.% solution of the ferrocene derivative surfactant. Thus was produced a green pigment dispersion herein.

The green pigment dispersion was mixed with the yellow pigment dispersion that had been prepared in Production Example 2, in a ratio by weight of 60/40 to produce a mixed, greenish yellow pigment dispersion. Next, this was further mixed with the electroconductive tin oxide dispersion that had been prepared in Production Example 1, in a ratio by weight of 45/55 to produce an electroconductive tin oxide-containing, green pigment dispersion. Production Example 5 Production of Electroconductive Tin Oxide-containing, Blue Pigment Dispersion To 15 kg of pure water, added were 1500 g of a pigment of copper phthalocyanine (from Dai-Nippon Ink Chemical), 306 g of a ferrocene derivative surfactant (10-ferrocenyldecanoylpolyoxyethylene), and 15.75 g of lithium bromide, and mixed. These were dispersed for 18 hours in an ultrasonic homogenizer with the resulting dispersion being cooled to be at around 18° C. Next, this was centrifuged in a continuous centrifuge at 10000 rpm, at a flow rate of 200 ml/min and at 25° C. Then, this was diluted 4.85-fold with a 0.3 wt.% solution of the same ferrocene derivative surfactant as above, and stirred for 12 hours at 25° C. to produce a blue pigment dispersion. The blue pigment dispersion was mixed with the electroconductive tin oxide dispersion that had been prepared in Production Example 1, in a ratio by weight of 50/50 to produce an electroconductive tin oxide-containing, blue pigment dispersion.

Example

Figure 3:
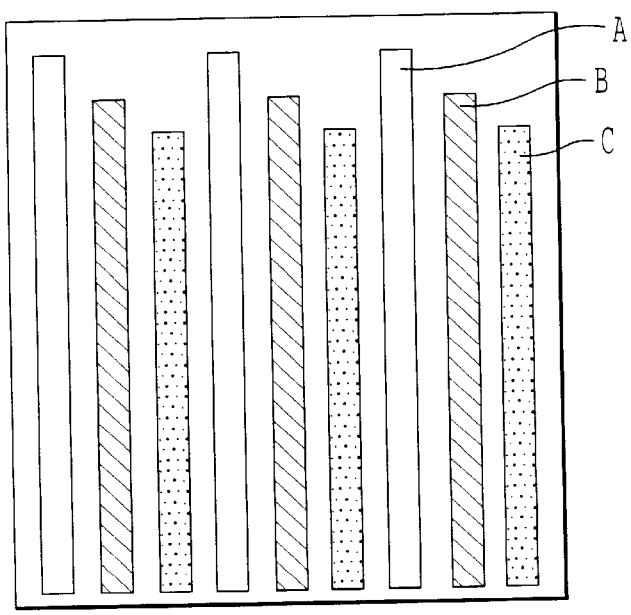
FIG. 3 is a plan view showing a substrate with stripe electrodes thereon for one embodiment of the invention.
Figure 4:
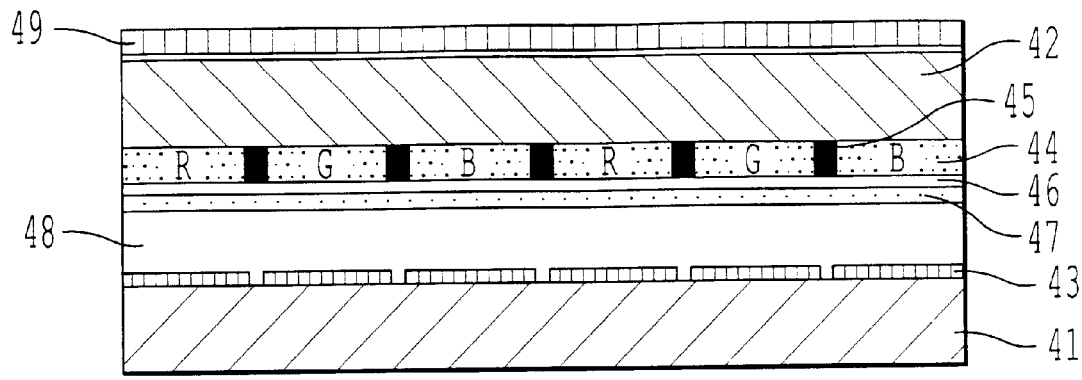
FIG. 4 is a cross-sectional view showing a prior art device with a color filter disposed on the light input side.
Figure 5:
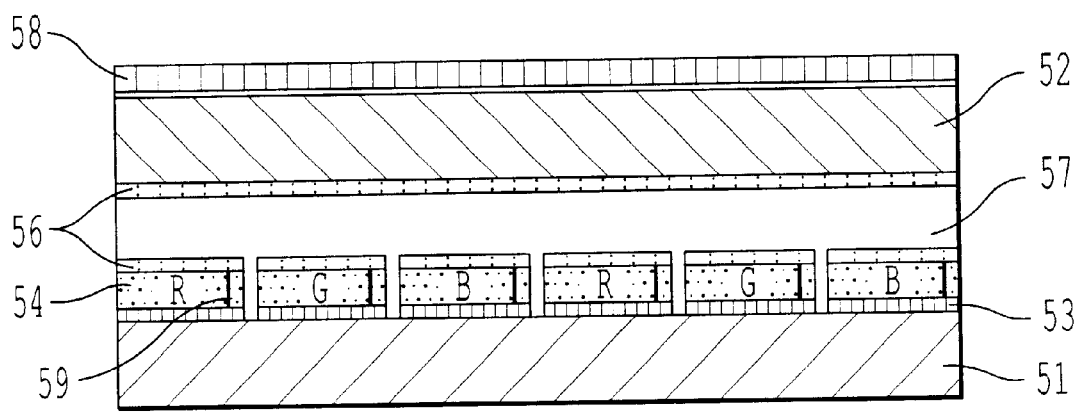
FIG. 5 is a cross-sectional view showing another prior art device with a color filter disposed on the light reflection side, in which is formed a transparent electrode on the color layer for the color filter.

Aluminium was deposited on a glass substrate (320×300 ×0.7 mm) through high-frequency sputtering to form thereon an aluminium layer having a thickness of 1500 angstroms. On the aluminium layer, deposited was a transparent, amorphous electroconductive film comprising indium oxide and zinc oxide as the essential components, also through sputtering. As the target for the sputtering, used was sintered $In_2O_3$—ZnO having an atomic ratio of In to Zn, In/(In+Zn), of 0.89. The target was put on the cathode in a planar magnetron sputtering device. As the discharging gas, used was pure argon or an Ar gas mixture containing a minor amount (about 1 vol.%) of $O_2$ gas. In that manner, formed was a transparent electrode film having a thickness of 1200 angstroms. The $In_2O_3$—ZnO film formed was an amorphous film, as giving no peak in X-ray diffractometry. This had a specific resistivity of about $3\times10^{-4}$ Ω·cm. This was photo-etched with an etching solution of $HCl/HNO_3/H_2O=1/6/3$ into a pattern of electrode stripes in which each electrode had a width of 90 μm and the electrode-to-electrode distance was 20 μm (see FIG. 3).

Next, the substrate with the electrode stripes thereon was dipped in the electroconductive tin oxide-containing, red pigment dispersion that had been prepared in Production Example 3, and electrically charged to flow current at the electrode A with +0.5 V for 15 minutes. For this, used were a saturated calomel electrode serving as the reference electrode, and a stainless steel sheet serving as the cathode. The substrate was taken out of the red pigment dispersion, and washed with pure water. In that manner, formed was a thin, electroconductive red pigment film on the electrode A. The substrate was baked at 150° C. for 30 minutes in an oven.

Next, the substrate was dipped in the electroconductive tin oxide-containing, green pigment dispersion that had been prepared in Production Example 4, and processed in the same manner as previously for the electrode B. Further, this was dipped in the electroconductive tin oxide-containing, blue pigment dispersion that had been prepared in Production Example 5, and processed also in the same manner as previously for the electrode C. Thus was produced an electroconductive color filter.

The electroconductive color filter was built into a liquid crystal cell having a TN liquid crystal therein, and the cell was tested for its driving characteristics. As a result, it was found that the driving characteristics of the cell fabricated herein were the same as those of an ordinary liquid crystal cell comprising an ordinary color filter with liquid crystal-driving ITO thereon. The angle of visibility to the cell with no color drift was ±60 degrees, and this is on the practicable level. For incident rays having a wavelength of about 600 nm, the cell panel had a spectral reflectance of about 15% in light conditions. After having been driven for one month, the cell was not troubled by local cell reaction between the transparent electrode and the reflection electrode, and its reflectance did not change.

Industrial Applicability

According to the invention, a color filter is produced by laminating a light-reflecting layer, a transparent electrode and a colorant layer with electroconductive grains therein, in that order on a substrate on the light reflection side, and this is built into a reflection-type liquid crystal display device. The device is not troubled by color drift (color mixing), and enjoys. a broad angle of visibility. In addition, even when driven for a long period of time, the device is not troubled by interconnection breakdown and panel reflectance depression, and can display all the time light images. The yield in the device fabrication is high.

What is claimed is:

1. A color filter comprising:
   a transparent or opaque substrate laminated to
   a light-reflecting layer comprising at least one metallic substance selected from the group consisting of aluminum, aluminum alloy and silver, which is laminated to
   a transparent electrode, which is laminated to
   a colorant layer containing fine electroconductive grains therein.

2. The color filter of claim 1, wherein said light-reflection layer comprises a metallic substance comprising aluminum as the essential component.

3. The color filter of claim 1, wherein said transparent electrode comprises an amorphous electroconductive oxide compound comprising indium oxide and zinc oxide as the essential components.

4. The color filter of claim 1, wherein said light-reflecting layer comprises at least one metallic substance selected from the group consisting of aluminum, aluminum alloy and silver.

5. The color filter of claim 1, wherein said light-reflecting layer has a thickness ranging from 500 to 3,000 angstroms.

6. The color filter of claim 1, wherein said transparent electrode comprises indium oxide and tin oxide and a doping metal selected from the group consisting of tin, aluminum, antimony, and gallium; and
   wherein said doping metal is present in an atomic ratio of not larger than 0.2 to said indium oxide and zinc oxide.

7. The color filter of claim 1, wherein said transparent electrode comprises indium oxide and zinc oxide; and
   wherein an atomic ratio of In/(In+Zn) falls between 0.2 and 0.9.

8. The color filter of claim 1, wherein said transparent electrode has a thickness ranging from 200 to 6,000 angstroms.

9. The color filter of claim 1, wherein said light-reflecting layer comprises a metallic substance selected from the group consisting of aluminum and aluminum alloy.

10. The color filter of claim 1, wherein said electroconductive grains comprise an electroconductive material selected from the group consisting of tin oxide, zinc oxide, indium oxide, tin oxide-doped indium oxide, mixed oxide of indium oxide and zinc oxide, carbon, aluminum, nickel and chromium.

11. The color filter of claim 1, wherein said electroconductive grains comprise an electroconductive material selected from the group consisting of tin oxide and tin oxide-doped indium oxide.

12. The color filter of claim 1, wherein said substrate is transparent.

13. The color filter of claim 1, wherein said substrate is opaque.

14. The color filter of claim 1, that is suitable for use in a reflection-type liquid crystal device.

15. A reflection type liquid crystal display device comprising the color filter of claim 1.

16. The display device of claim 15, comprising:
a first substrate comprising said color filter, wherein said color filter faces a liquid crystal layer,
the liquid crystal layer, and
a second substrate comprising a transparent electrode facing the liquid crystal layer and a polarizing plate on the outer surface of the second substrate,
wherein said first and second substrates face each other via said liquid crystal layer existing therebetween.

17. The display device of claim 15, wherein said color filter comprises a light-reflecting layer comprising aluminum.

18. The display device of claim 15, wherein said color filter comprises a transparent electrode comprising an amorphous electroconductive oxide compound.

19. The display device of claim 15, wherein said color filter comprises a transparent electrode comprising indium oxide and zinc oxide.

20. The display device of claim 15, wherein said color filter comprises a light reflecting layer comprising at least one metallic substance selected from the group consisting of aluminum, aluminum alloy and silver.

21. The display device of claim 15, wherein said color filter comprises a light-reflecting layer that has a thickness ranging from 500 to 3,000 angstroms.

22. The display device of claim 15, wherein said color filter comprises a transparent electrode comprising indium oxide and tin oxide and a doping metal selected from the group consisting of tin, aluminum, antimony, and gallium; and
wherein said doping metal is present in an atomic ratio of not larger than 0.2 to said indium oxide and zinc oxide.

23. The display device of claim 15, wherein said color filter comprises a transparent electrode comprising indium oxide and zinc oxide; and
wherein an atomic ratio of In/(In+Zn) falls between 0.2 and 0.9.

24. The display device of claim 15, wherein said color filter comprises a transparent electrode that has a thickness ranging from 200 to 6,000 angstroms.

25. The display device of claim 15, wherein said color filter comprises a light-reflecting layer comprising a metallic substance selected from the group consisting of aluminum and aluminum alloy.

26. The display device of claim 15, wherein said color filter comprises a colorant layer with fine electroconductive grains comprising an electroconductive material selected from the group consisting of tin oxide, zinc oxide, indium oxide, tin oxide-doped indium oxide, mixed oxide of indium oxide and zinc oxide, carbon, aluminum, nickel and chromium.

27. The display device of claim 15, wherein said color filter comprises a colorant layer with fine electroconductive grains that comprise an electroconductive material selected from the group consisting of tin oxide and tin oxide-doped indium oxide.

* * * * *